United States Patent Office

3,235,620
Patented Feb. 15, 1966

3,235,620
COMPOSITIONS COMPRISING DIGLYCIDYL DI-
ETHER OF DIHYDRIC PHENOLS AND VINYL-
CYCLOHEXENE DIOXIDE
Benjamin Phillips, Charleston, and Charles W. McGary, Jr., and Charles T. Patrick, Jr., South Charleston, W. Va., assignors to Union Carbide Corporation, a corporation of New York
No Drawing. Filed May 15, 1961, Ser. No. 109,848
15 Claims. (Cl. 260—830)

The instant application is a continuation-in-part of application Serial No. 802,643 filed March 30, 1959, now abandoned, in the names of the same inventors as the instant application.

This invention relates to polyepoxide compositions. In one aspect, this invention relates to effectively reducing the working viscosity of a polyglycidyl polyether of a polyhydric phenol by incorporating therewith an amount of 4-vinylcyclohexene dioxide, the resulting mixture upon curing exhibiting improved physical properties. In another aspect, this invention relates to curable, polymerizable compositions of 4-vinylcyclohexene dioxide and a polyglycidyl polyether of a polyhydric phenol, and to the thermosetting and thermoset compositions resulting therefrom. In a further aspect, this invention is directed to the preparation of compositions of 4-vinylcyclohexene, a polyglycidyl polyether of a polyhydric phenol, and an active organic hardener.

Many of the conventional epoxides, e.g., the reaction products of epichlorohydrin and dihydric phenols are limited in one way or another in their applicability to a narrow range of uses. To a large degree, the working viscosity limits the fields of uses of these epoxides or formulations containing these epoxides. In the manufacture of coatings, as an example, it is desirable to use coating formulations which have ranges of viscosities which are neither so low that the formulation flows off of the surface being coated nor so high that it is arduous or impossible to conveniently apply it. Also, if the coating is to be applied by spraying, a low viscosity formulation is preferable, and when the coating is to be applied by brushing or wet lay-up procedures, a higher viscosity formulation is more useful. Similarly, the viscosities of these epoxides or formulations containing them are largely determinative of the fields of use to which they may be applied, for example, in the casting, molding or bonding arts and the like. Illustratively, in casting or molding, low viscosity epoxide formulations which quickly and completely fill intricacies of molds are preferred. Low viscosity formulations capable of accepting up to large amounts of solid materials, e.g., fillers and pigments, are desirable in coating application as well as in casting, molding or bonding applications. Adjustments to the epoxide or epoxide formulation viscosity, which may be possible by increasing the temperature of the epoxide or epoxide formulation, or by the addition of non-reacting solvents or reactive diluents, tend to cause additional problems in preparing, applying and curing the formulations and, in many cases, add new limitations to the physical and chemical properties of resins made from such formulations, thereby restricting their usefulness. In preparing such epoxide formulations, increases in epoxide temperatures to reduce the viscosities of said epoxides for mixing with other components, such as hardeners, promote premature and localized curing, the expulsion of formulation components, or high exothermic heat accumulations during subsequent curing which can internally damage the resulting resins. In addition, the application and curing of such epoxide formulations are made more difficult and expensive. When non-reacting solvents are employed to reduce viscosities, additional steps or procedures and costly equipment need to be employed to remove the solvent when converting the epoxide formulation to a resin. Some solvent may be entrained in the resin, or may produce bubbles which are entrained in the resin, thereby causing irregularities and weak points. Unremovable amounts of such entrained bubbles and solvent bring about defects in the physical properties, e.g., flexural strength, hardness, impact strength, heat distortion value of resins containing them and, in addition, provide sites for attack by chemicals. Although reactive diluents may be employed to reduce viscosities, the differences of functionality, reactivity and/or volatility of the reactive diluent and the epoxide or epoxide formulation can be instrumental in causing irregularities and defects in resins made therefrom. Monofunctional diluents can cause undue shrinkage and drastic reductions in physical properties, such as those previously mentioned, of resins formed from formulations containing them. Difunctional diluents of low reactivity may be, in effect, only physically entrained in resins made from formulations diluted thereby and cause reductions in resin properties. Highly reactive diluents may greatly increase the exotherms encountered when converting formulations containing them to resins. Uncontrolled exotherms can cause thermal decomposition of some formulation components as evidenced by charring, and can cause the expulsion of other components as evidenced by bubble formation and foaming. Volatile reactive diluents can be readily expelled from the formulations and similar to the effects of non-reactive solvents, form bubbles and foam. Other reactive diluents are extremely toxic and, hence, are not conducive to safe use in making resins.

The present invention contemplates a new class of epoxide compositions of 4-vinylcyclohexene dioxide and a polyglycidyl polyether of a polyhydric phenol. These epoxide compositions can be prepared as solids, or liquids having viscosities as low as 50 centipoises, and lower, at room temperature, i.e., approximately 25° C. The viscosities of the liquid epoxide compositions of the instant invention can be controlled, as desired, without the aid of external modifications such as raising the temperature or using non-reactive solvents or reactive diluents and the like, although such modifications may be employed, if desired. These epoxide compositions can be made with the capability of accepting wide varieties of solid materials such as fillers, pigments, and the like. The liquid epoxide compositions are particularly noteworthy in being capable of accepting large amounts of solid material without at the same time entraining large amounts of air or causing damage to the solid material particles. The epoxide compositions can be cured, i.e., polymerized, by catalysts such as, mineral acids, metal halide Lewis acids, strong bases, and the like, to thermosetting and thermoset products. They can be reacted with active organic hardeners, for example, polycarboxylic acids and halides, polyfunctional amines, polyhydric phenols and alcohols, polycarboxylic anhydrides, and the like, to provide a wide variety of useful articles. The epoxide compositions of this invention have improved pot-lives which can be controlled, as desired, to fit specific needs. Such epoxide compositions can be made so as to cure rapidly (in the presence of catalysts and/or active organic hardeners), or they are capable of storage without incurring appreciable gelation for extended periods prior to use whichever the manufacturing techniques being employed may demand. The lowest temperatures at which the epoxide compositions can be easily cured can be adjusted, as desired, and compositions having minimum curing temperatures as low as 10° C., and lower, can be made in accordance with the instant invention. The compositions can be cured to resins which are uniform and do not contain foam, entrained solvent, or bubbles. Exothermic heat evolved during the curing of the compositions is within easily controllable limits, and expensive equipment or extra procedures for removing excess heat is not required, although such techniques can be employed, if desired. During the curing of the compositions very little shrinkage, if any, occurs and resinous articles having intricately molded surfaces can be manufactured therefrom.

The resins of this invention can be made as infusible products which are insoluble in most chemicals and which have remarkable resistance to attack by strong acids and bases. These resins also can be made into tough, strong products which can be machined to a variety of shapes or polished to provide appealing finishes. In the form of coatings or laminates they are capable of tenaciously adhering to a wide variety of materials including such nonporous materials as glass and metals and have low coefficients of thermal expansion. Resins having improved flexural strengths and impact resistances can be made by the practice of the instant invention. The resins of this invention can be made as hard articles having improved resistances to scratching and wear. They can be made in appealing colors with good color retention properties, and are useful in the manufacture of a variety of articles having decorative appearances.

Accordingly, one or more of the following objects will be achieved by the practice of this invention.

It is an object of this invention to prepare novel curable, partially cured, and cured compositions of 4-vinylcyclohexene dioxide and a polyglycidyl polyether of a polyhydric phenol. It is another object of this invention to prepare novel epoxide compositions of 4-vinylcyclohexene dioxide and a polyglycidyl polyether of a polyhydric phenol wherein the viscosity of said compositions can be controlled to fit particular applications by controlling the amount of 4-vinylcyclohexene dioxide in said compositions. A further object of this invention is directed to accelerating the cure rate of novel compositions of 4-vinylcyclohexene and a polyglycidyl polyether of a polyhydric phenol by incorporating therein catalytic hardeners such as the strong mineral acids, alkali metal hydroxides, metal halide Lewis acids, and the like. A yet further object of this invention is directed to the preparation of novel curable compositions of 4-vinylcyclohexene dioxide, a polyglycidyl polyether of a polyhydric phenol, and an active organic hardener such as polyfunctional amines, polycarboxylic acids, polycarboxylic acid anhydrides, polyhydric alcohols, polyhydric phenols, and the like. Numerous other objects of the present invention will become apparent to those skilled in the art from a consideration of the instant specification.

By the term "polyglycidyl polyether of a polyhydric phenol," as used herein, is meant a polyepoxide compound having terminal epoxy groups, one or more aromatic nucleus or nuclei including fused aromatic nuclei, and at least two aliphatic groups including terminal epoxy-containing aliphatic groups, the aliphatic groups being united to said aromatic nucleus or nuclei through carbon to oxygen to carbon linkages. For brevity, polyglycidyl polyether of a polyhydric phenol is also hereinafter referred to as "polyglycidyl polyether(s)." By the term "epoxy group, epoxide, or polyepoxide," as used herein, is meant a group or organic compound which contains adjacent carbon atoms to which oxirane oxygen is attached, for example

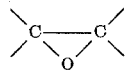

As stated previously, the broad aspect of the instant invention is directed to epoxide compositions of (a) 4-vinylcyclohexene dioxide and (b) a polyglycidyl polyether of a polyhydric phenol. In general, the composition can contain from about 2 to about 98 weight percent of 4-vinylcyclohexene, based on the total weight of 4-vinylcyclohexene dioxide and polyglycidyl polyether; from about 10 to about 90 weight percent of 4-vinylcyclohexene dioxide, based on the above-said total weight, is preferred.

The epoxide compositions of this invention can be prepared by mixing 4-vinylcyclohexene dioxide with polyglycidyl polyethers of polyhydric phenols. It has been found advantageous to perform the mixing at a temperature which is not less than the softening point, or melting range, of the polyglycidyl polyether, although lower temperatures can be used, if desired. Mixing can be facilitated by using higher temperatures and agitation. These mixtures can be employed immediately or stored for long periods without appreciable increases in viscosity or other signs of polymerization. They can be made as homogeneous solids or homogeneous liquids which remain homogeneous and have been found not to form separate phases despite changes in temperature. Compositions having many desired viscosities can be obtained by adjusting the relative proportions of 4-vinylcyclohexene dioxide and polyglycidyl polyether. Those compositions which contain a greater weight percentage of 4-vinylcyclohexene dioxide have been found to have lower viscosities than the corresponding systems which contain a relatively smaller weight percentage of 4-vinylcyclohexene dioxide. Viscosities of these epoxide compositions can also be controlled through the selection of polyglycidyl polyethers, such that higher viscosity compositions can be made from higher viscosity polyglycidyl polyethers and lower viscosity compositions are obtainable from lower viscosity polyglycidyl polyethers. The melting points or softening ranges of the solid compositions have been found to be lower than those of their highest melting components. In addition, the softening ranges of these solid compositions can be controlled by adjustments in the relative proportions of 4-vinylcyclohexene dioxide and polyglycidyl polyethers, those compositions containing a greater weight percentage of 4-vinylcyclohexene dioxide possessing lower melting points than the corresponding systems which contain a relatively smaller weight percentage of 4-vinylcyclohexene dioxide.

In one embodiment of this invention, the epoxide compositions (or mixtures) of 4-vinylcyclohexene dioxide and a polyglycidyl polyether of a polyhydric phenol can be admixed with a catalyst and/or an active organic hardener, both to be described hereinafter in greater detail. The resulting admixture thus is a curable composition capable of being fully cured or polymerized to the solid state. These curable compositions can be heated to a temperature in the range of from about 10° to about 250° C., preferably from about 20° to about 200° C., for a period of time sufficient to produce the product desired. Should a liquid product of a particular viscosity range be desired, the operator can terminate the heating step when such viscosity range has been reached. Likewise, if thermosetting solids (thermosetting intermediate reaction products) or hard or infusible solids are desired, the heating step can be continued until the desired product is produced. Temperatures higher than 250° C. can be used although some discoloration which may not be desired may be brought about in curing to the resin. The time for effecting a partial cure or complete cure will be governed, to an extent, on several factors such as the particular polyglycidyl polyether employed, the proportions of 4-vinylcyclohexene dioxide and polyglycidyl ether used, the inclusion of an active organic hardener described hereinafter to the system, the temperature for effecting the degree of cure desired, the use of a catalytic quantity of a catalyst described hereinafter to the system, and other considerations. In general, the time for effecting the complete cure can vary from several minutes, e.g., five minutes, to about several days, e.g., one week, and longer, depending upon the correlation of such factors as noted above.

In forming the curable compositions, the catalyst and/or active organic hardener is preferably mixed with the epoxide compositions so as to form curable compositions which are homogeneous. It has been observed that the pot-lives of the curable compositions can be controlled to fit various particular needs by varying the relative proportions of 4-vinylcyclohexene dioxide and polyglycidyl polyether contained in the epoxide compositions employed. Illustratively, epoxide compositions which contain a greater weight percentage of 4-vinylcyclohexene dioxide have been found to require longer times to gel when mixed with, for example, a polyamine hardener than the corresponding epoxide systems containing a smaller weight percentage of 4-vinylcyclohexene dioxide.

In forming the curable mixtures from catalysts and epoxide compositions, an advantageous method is to add the catalyst to the composition at the lowest temperature required to form a liquid mixture. Mixing temperatures of 10° to 25° C. have been found to be advantageous. Stirring then can be employed to obtain a homogeneous, curable mixture. If desired, higher temperatures may be employed with, however, the possibility of inducing premature and localized curing around catalyst particles prior to the formation of a homogeneous, curable mixture. In most cases it may be desirable to obtain a homogeneous mixture before bringing about any substantial degree of curing and in such instances low mixing temperatures of the order specified above can be employed. Catalyst concentrations and curing temperatures are believed to affect the curing rate, the higher concentrations and temperatures promoting faster cures than the lower ones. Catalyst concentrations can be varied over a broad range and can be selected on the basis of the rate of cure desired and the curing temperature to be used. It has been found, however, that catalyst concentrations from about 0.005, and lower, to 25.0 weight percent, based on the weight of epoxide composition, are advantageous in forming valuable thermoset resins from the curable compositions. Although higher concentrations can be employed, no particular advantage is apparent. Preferred catalyst concentrations are within the range of from about 0.005 to about 15.0 weight percent, based on the weight of epoxide composition. The mixtures of epoxide compositions and catalysts can be cured at temperatures up to 250° C. Temperatures over 250° C. may be used though discoloration, which may be undesirable, may be caused. Discoloration which may be induced at temperatures over 250° C. can be reduced to a minimum, however, by lowering the catalyst concentration in the curable mixture. In the preferred method of curing, the mixture is brought to a temperature of about 50° C. to 150° C. until a gel, or partially cured solid, is formed. After formation of the gel, the temperature of the mixture is then maintained at an approximate temperature within the range of 100° C. to 200° C. to complete the cure. Although this is a preferred method, other single temperatures or combinations of temperatures, preferably none of which are higher than 250° C., can be used for curing.

In forming the curable mixture from active organic hardeners and epoxide compositions, it is advantageous to first mix the active organic hardener in liquid form with the epoxide composition in liquid form. When the active organic hardener and epoxide composition are both in the liquid state at temperatures, for example, below about 30° C., they can be simply mixed together at room temperature and stirred to form a homogeneous, curable mixture. Higher temperatures may be used for mixing and in fact can facilitate the mixing, particularly when the active organic hardener or the epoxide composition or both are in the solid state at room temperature. It is preferable to employ mixing temperatures which are elevated just high enough to place both the active organic hardener and epoxide compositions in the liquid states, so as to avoid any substantial degree of premature curing. Methods other than the preferred method for preparing curable mixtures from the epoxide compositions and active organic hardeners can be used, if desired. For example, solvents or reactive diluents can be employed to place the active organic hardener and epoxide composition in liquid form below about 30° C., or the active organic hardener or epoxide composition or both can be mixed in other than liquid form, as desired. The relative amounts of active organic hardener and epoxide composition can be varied over a wide range to produce a wide variety of useful products. Temperatures for effecting cures can be varied as desired but those below about 250° C. are preferred. Higher temperatures encourage a faster rate of cure while the lower temperatures effect a slower rate of cure. An advantageous method of curing these curable mixtures is to maintain the mixture at temperatures in the range of 50° C. to 150° C. until a gel, or partially cured solid, is formed. This gel is then maintained at a temperature in the 100° C. to 200° C. range to complete the cure. Other single curing temperatures or combinations of curing temperatures can be used. Catalysts can also be employed to quicken the rate of cure. Higher catalyst concentrations promote faster curing rates than lower concentrations in the same systems under correspondingly similar conditions. Although catalyst concentrations over a wide range may be used, it is preferred to employ them in concentrations of up to 5.0 weight percent, based on the weight of epoxide composition.

4-vinylcyclohexene dioxide which is employed to effectively reduce the viscosity of the polyglycidyl polyethers so that tailor-made viscosity ranges of epoxide compositions are obtainable to fit particular applications while at the same time imparting improved characteristics and properties to the cured resins prepared therefrom, is not a new compound. Various modes of preparing 4-vinylcyclohexene dioxide are adequately described in the literature, e.g., U.S. Patent No. 2,539,341.

Polyglycidyl polyethers which can be advantageously used as a component in the epoxide compositions of this invention can be characterized by their epoxy equivalents and melting points, or melting point ranges. By the term "epoxy equivalent," as used herein, is meant the weight of polyglycidyl polyether which contains one mol of epoxy group. The epoxy equivalent can be determined by heating a one gram sample of the polyglycidyl polyether with a pyridine solution containing a known quantity of pyridine hydrochloride for about one hour and titrating with sodium hydroxide or potassium hydroxide to determine the amount of unreacted pyridine hydrochloride. From this, the amount of pyridine hydrochloride that has reacted with the epoxy groups of the polyglycidyl polyether can be calculated. From these data the number of grams of polyglycidyl polyether per epoxy group contained thereby, that is, the epoxy equivalent, can be determined by taking one mole of pyridine hydrochloride as equivalent to one mole of epoxy group. Melting point ranges, as used herein, were determined by the Durran's Mercury Method.

Many methods are known in the art for preparing polyglycidyl polyethers. They can be advantageously prepared by the reaction of halohydrins, such as, monohalohydrins, polyhalohydrins, epihalohydrins and the like, with polyhydric phenols. An advantageous method for such a preparation is to heat a dihydric phenol with epichlorohydrin in the presence of sufficient caustic alkali, or other strong aqueous alkali, e.g., potassium hydroxide, to combine with the chlorine of epichlorohydrin. It is preferable to use a stoichiometric excess of alkali so as to insure the complete combination of chlorine. Theoretically, one mol of epichlorohydrin will react with one hydroxyl group of polyhydric phenol to form the polyglycidyl polyether of the phenol. For example, two mols of epichlorohydrin are theoretically required to react with one mol of a dihydric phenol to form the diglycidyl diether of the phenol. In practice, however, a higher ratio than two mols of epichlorohydrin per mol of dihydric phenol has been required in order to form the diglycidyl diether of the phenol. The chain length and extent of polymerization can be varied by changing the mol ratio of epichlorohydrin to dihydric phenol within the range of 10:1 to 1.2:1. Thus, by decreasing the mol ratio of epichlorohydrin to dihydric phenol from 10 towards 1.2, polyglycidyl polyethers having longer chain lengths, higher epoxy equivalents and higher softening points can be obtained. The reaction temperature can be preferably controlled at from 25° C. to 100° C. by regulating the amount of water in the aqueous alkali added or by cooling the walls of the reaction vessel with a circulating cooling medium or by any other suitable cooling means. Towards the end of the reaction the addition of heat may be required to maintain the temperature of the reaction mixture at the desired level within the range from 50° C. to 100° C. The overall reaction time can be made to vary from thirty minutes to three hours, or more, depending upon the temperature, proportion of reactants, and method of mixing the reactants. The polyglycidyl polyether product can be recovered from the reaction mixture by methods well recognized in the art.

The lower molecular weight polyglycidyl polyethers which can be formed as described above can be further polymerized by heating with less than equivalent amounts of the same, or different polyhydric phenol, to form longer chain polyglycidyl polyethers. For example, a diglycidyl diether of a dihydric phenol can be mixed with a less than equivalent amount of the same or different dihydric phenol. In further polymerizing polyhydric phenols and low molecular weight polyglycidyl polyethers formed by the reaction of a halohydrin and a polyhydric phenol, the phenol and epoxide can be mixed and heated with or without a catalyst. By heating the mixture without a catalyst, polymerization takes place but at a slower rate. Catalyst suitable for accelerating the rate of reaction include alkalis and alkaline reacting substances, acids, salts, basic nitrogen compounds, metallic surfaces, and the like.

Typical halohydrins which can be used in the preparation of the polyglycidyl polyethers include monohalohydrins, e.g., 3-chloro-1,2-propanediol; polyhalohydrins, e.g., glycerol dichlorohydrin, bis(3-chloro-2-hydroxypropyl) ether, bis(3 - chloro-2-methyl-2-hydroxypropyl)ether, 2-methyl - 2-hydroxy-1,3-dichloropropane, 1,4-dichloro-2,3-dihydroxybutane, and the like; and apihalohydrins, e.g., epichlorohydrin which is preferred. Illustrative of polyhydric phenols which can be used in preparing polyglycidyl polyethers are mononuclear phenols and polynuclear phenols. Typical polyhydric phenols include resorcinol, catechol, hydroquinone, phloroglycinol and the like. Typical polynuclear phenols include p,p′-dihydroxydibenzyl, p,p′-biphenol, p,p′-dihydroxyphenyl sulfone, p,p′-dihydroxybenzophenone, 2,2′dihydroxy-1,1′ - dinaphthylmethane, and the 2,2′; 2,3′; 2,4′; 3,3′; 3,4′; and 4,4′; isomers of dihydroxydiphenylmethane, dihydroxydiphenyldimethylmethane, dihydroxydiphenylethylmethylmethane, dihydroxydiphenylmethylpropylmethane, dihydroxydiphenylethylphenylmethane, dihydroxydiphenylpropylphenylmethane, dihydroxydiphenylbutylphenylmethane, dihydroxydiphenyltolylmethane, dihydroxydiphenyltolylmethylmethane, dihydroxydiphenyldicyclohexylmethane, dihydroxydiphenylcyclohexane, polyhydric phenolicformaldehyde condensation products, and the like. Preferred polyglycidyl polyethers are those which contain as reactive groups only epoxy groups and hydroxyl groups. These preferred polyglycidyl polyethers have melting points or melting point ranges of not greater than 160° C.

Suitable catalysts which can be employed in the epoxide compositions of this invention to promote the curing of said compositions to resins include basic and acidic catalysts. Catalysts which are effective include the mineral acids, e.g., sulfuric acid, perchloric acid, polyphosphoric acid, phosphoric acid and partial esters of phosphoric acid such as dimethyl dihydrogen pyrophosphate, and the like; the sulfonic acids, e.g., ethylsulfonic acid, benzenesulfonic acid, toluenesulfonic acid, lower alkyl-substituted aromatic sulfonic acids, and the like; the metal halide Lewis acids, e.g., boron trifluoride, stannic chloride, zinc chloride, ferric chloride, aluminum chloride, boron trifluoride-piperidine complex, boron trifluoride-monoethylamine complex, boron trifluoride-1,6-hexanediamine complex, boron trifluoride-dimethyl ether complex, boron trifluoride-diethyl ether complex, and the like. Basic catalysts which can also be employed with advantageous effect to increase the cure rate and reduce the gelation period include the alkali metal hydroxides, e.g., sodium hydroxide, potassium hydroxide, and the like; the amines, e.g., alpha-methylbenzyldimethylamine, dimethylethylamine, dimethylaminoethylphenol, 2,4,6-tris(dimethylaminoethyl)phenol, triethylamine, trimethylammonium hydroxide, and the like.

Uniform dispersions of catalyst in the curable compositions of this invention prior to curing have been found to be desirable in order to minimize local curing around catalyst particles. Agitation of the curable compositions as the catalyst is added is sufficient when the catalyst is miscible with the composition. When the two, i.e., catalyst and curable composition, are immiscible, the catalyst can be added as a solution in an organic solvent. Typical solvents for the catalysts include organic ethers, e.g., diethyl ether, propyl ether, and the like; organic esters, e.g., methyl acetate, ethyl propionate, and the like; organic ketones, e.g., acetone, cyclohexanone, and the like. In addition, water can be employed as a solvent for the mineral acid and basic catalysts.

The 4-vinylcyclohexene dioxide-polyglycidyl polyether systems of this invention, with or without the inclusion of a catalyst of the type illustrated above, can be reacted with an active organic hardener or combination of active organic hardeners. By the term "active organic hardener," as used herein, is meant an organic compound which contains two or more groups which are reactive with epoxy groups. The active organic hardeners illustrated hereinafter are employed in a curing amount, that is, an amount which is at least sufficient to cause the epoxide system containing said active organic hardener(s) to become thermoset resins in accordance with the teachings of the instant specification. Typical groups which are reactive with epoxy groups are active hydrogen groups such as hydroxy groups, carboxy groups, amino groups, and the like; and isocyanate groups, isothiocyanate groups, halide atoms of acyl halides, and the like. Oxydicarbonyl groups such as those contained by polycarboxylic acid anhydrides are also reactive with epoxy groups. One oxydicarbonyl group will react with two epoxy groups and, in this connection, polycarboxylic acid anhydrides need only contain one oxydicarbonyl group in order to function as an active organic hardener with the epoxide compositions of this invention. Stated differently, one oxydicarbonyl group of an anhydride is equivalent to two epoxy-reactive groups.

Representative active organic hardeners include polyfunctional amines, polycarboxylic acid, polycarboxylic acid anhydrides, polyhydric phenols, polyhydric alcohols, polyisocyanates, polythioisocyanates, and polyacyl halides.

As active organic hardeners for the epoxide compositions of this invention, polyfunctional amines have been found to be particularly useful. By the term "polyfunctional amine," as used herein, is meant an amine having at least two active amino hydrogen atoms which can be on the same nitrogen atom or different nitrogen atoms. Curable compositions can be formed as previously described from the epoxide compositions and polyfunctional amines at temperatures in the 15° to 25° C. range, and higher, if desired. Although the epoxide compositions can be mixed in various other relative proportions, it has been found that resins having particularly valuable properties, such as those set forth above, can be formed from mixtures containing the epoxide compositions and polyfunctional amines in such relative proportions as provide from 0.2 to 5.0 amino hydrogens of the amine for each epoxy group contained by said epoxide composition. It is preferred to form resins from curable mixtures containing the epoxide compositions and polyfunctional amines which provide from 0.3 to 3.0 amino hydrogens for each epoxy groups.

Acidic or basic catalysts, such as those set forth previously, and alcohol or phenol catalysts, e.g., ethylene glycol, 2,2-bis(4-hydroxyphenyl)propane, hexanetriol, resorcinol, and the like, can be added to these curable mixtures to increase the rate of cure, the higher catalyst concentrations effecting faster cures than lower concentrations. Resins formed from curable mixtures containing the epoxide compositions and polyfunctional amines are particularly valuable in that they are infusible, solvent- and chemical-resistant, capable of tenaciously adhering to a variety of materials, hard and firm. These curable mixtures are particularly useful for applications wherein high temperatures cannot be employed in curing but wherein resins having the advantageous properties set forth above are desired.

Among the polyfunctional amines contemplated as active organic hardeners include the aliphatic amines, aromatic amines, aralkyl amines, cycloaliphatic amines, alkaryl amines, aliphatic polyamines including polyalkylene polyamines, amino-substituted aliphatic alcohols and phenols, polyamides, addition products of polyamines and low molecular weight epoxides containing oxirane oxygen linked to vicinal carbon atoms, and others.

Typical aliphatic amines include methylamine, ethylamine, propylamine, isopropylamine, butylamine, isobutylamine, 2-ethylhexylamine, 3-propylheptylamine, and the like.

Examples of aromatic amines, aralkyl amines and alkaryl amines include, among others, aniline, o-hydroxyaniline, m-toluidine, 2,3-xylidine, benzylamine, phenethylamine, 1-naphthylamine, meta-, ortho-, and para-phenylenediamines, 1,4-naphthalenediamine, 3,4-toluenediamine and the like.

Illustrative cycloaliphatic amines include cyclopentylamine, cyclohexylamine, p-menthane-1,8-diamine and others.

Among the polyamides, i.e., those having an average molecular weight range from about 300 to about 10,000, include condensation products of polycarboxylic acids, in particular, hydrocarbon dicarboxylic acids, such as malonic acid, succinic acid, glutaric acid, adipic acid, dilinolenic acid, and the like, with polyamines, particularly diamines, such as ethylenediamine, propylenediamine and the like.

The aliphatic polyamines contemplated include ethylenediamine, propylenediamine, butylenediamine, pentylenediamine, hexylenediamine, octylenediamine, nonylenediamine, decylenediamine, and the like. Polyalkylene polyamines such as diethylenetriamine, triethylenetetramine, tetraethylenepentamine, dipropylenetriamine, and the like, are particularly suitable.

The amino-substituted aliphatic alcohols and phenols suitable for use in the present invention are illustrated by 2-aminoethanol, 2-aminopropanol, 3-aminobutanol, 1,3-diamino-2-propanol, 2-aminophenol, 4-aminophenol, 2,3-diaminoxylenol, and the like.

Other illustrations of polyfunctional amines are the addition products of polyamines, in particular, diamines and triamines and epoxides containing oxirane oxygen linked to vicinal carbon atoms, such as ethylene oxide, propylene oxide, butadiene dioxide, diglycidyl ether, epoxidized soybean oil, epoxidized safflower oil, and polyglycidyl polyethers, such as those prepared from polyhydric phenols and epichlorohydrin. Particularly useful polyfunctional amines are the mono- and polyhydroxyalkyl polyalkylene and arylene polyamines which can be prepared by the addition reaction of polyalkylene polyamines, arylene polyamines, and the like, e.g., ethylenediamine, propylenediamine, diethylenetriamine, hexamethylenediamine, triethylenetetramine, tetraethylenepentamine, phenylenediamine, methylenedianiline, xylenediamine, and the like, with ethylene oxide or propylene oxide such that the resulting amine adduct contains two or more active hydrogen atoms attached to either one or more amino nitrogen atoms. This reaction can be conducted under pressure at temperatures of 50° C. or 55° C. to boiling in the absence of solvents or in the presence of water or an alcohol. However, the reaction is more advantageously carried out at temperatures below 40° C. and preferably below 35° C. without pressure. Other polyfunctional amines can be prepared from known procedures by the addition reaction of polyglycidyl polyethers of dihydric phenols and polyamines, in particular, polyalkylene polyamines. Of particular importance in forming these epoxide polyamine adducts are the diglycidyl diethers of dihydric phenols such as, for example, the homologues of dihydroxydiphenylmethanes singly or mixed and the dihydroxydiphenyldimethylmethanes singly or mixed. Mixtures of diglycidyl diethers of dihydric phenols can be prepared by reacting epichlorohydrin with a dihydric phenol using a molar excess of epichlorohydric over the theoretical molar requirement. Substantially pure cuts of the diglycidyl diethers then can be obtained by fractional distillation under reduced pressure, for example. Illustratively, the polyfunctional amine, i.e., the epoxide polyamine adduct, itself can be prepared by mixing the diglycidyl diether of a dihydric phenol with a polyalkylene diamine such as diethylenetriamine, dipropylenetriamine, and the like, bringing to an elevated temperature for example, up to about 200° C. and maintaining at such an elevated temperature for a period of from 4 to 5 hours. Alternatively, as an illustration, polyfunctional amines can be prepared by adding a diglycidyl diether of a dihydric phenol to a polyalkylene polyamine over a period of time, e.g., from about three to four hours, while maintaining the reaction mixture at an elevated temperature, for example, up to about 200° C. and subsequently adding a dihydric phenol.

Examples of still other polyfunctional amines suitably adaptable include, among others, heterocyclic nitrogen compounds such as piperazine, 2,5-dimethylpiperazine, and the like; aminoalkyl-substituted heterocyclic compounds such as N-(aminopropyl)morpholine, N-(aminoethyl)morpholine, and the like; amino-substituted heterocyclic nitrogen compounds such as melamine, 2,4-diamino-6-(aminoethyl)pyrimidine, and the like; dimethylurea, guanidine, p,p'-sulfonyldiamine, 3,9-bis(aminoethyl)sipirobimetadioxane, hexahydrobenzamide, and others.

Other polyfunctional amines having a total of at least two active amino hydrogen atoms to the molecule can be advantageously employed in the epoxide compositions of this invention. For example, such polyfunctional amines as mixtures of p,p'-methylenedianiline and m-phenylenediamine, or other mixtures of two or more polyfunctional amines can be used.

Another class of active organic hardeners which can be reacted with the epoxide compositions of this invention, which epoxide compositions may or may not contain an acid or basic catalyst of the type illustrated above, are the polycarboxylic acids. By the term "polycarboxylic acid", as used herein, is meant a compound having two or more carboxyl groups to the molecule. Curable mixtures can be formed from the epoxide compositions and polycarboxylic acids, which mixtures can be cured to produce a wide variety of useful products. These curable mixtures can be formed at temperatures ranging from about 25° to 150° C., and higher, if desired. In an advantageous method, the epoxide compositions and polycarboxylic acid are mixed at room temperatures. This mixture is then made homogeneous by stirring or by heating or by both stirring and heating. It has been found that mixtures containing low-melting polycarboxylic acids which are liquids at room temperature can be made homogeneous by stirring only, although warming ten degrees or fifteen degrees centigrade above room temperature aids in forming the homogeneous mixtures.

Mixtures containing high-melting polycarboxylic acids which are semi-solids or solids at room temperature can be advantageously made homogeneous by stirring and heating just to the melting point or melting point range of the polycarboxylic acid. Higher temperatures, however, can be used in forming homogeneous curable mixtures, if desired. These curable mixtures can be cured at temperatures from about 25° to 250° C. Temperatures over 250° C. can be used, if desired, but they are not preferred. Lower-temperatures encourage slower curing rates than higher temperatures. The rate of cure of these mixtures can be increased by the addition thereto of an acid or basic catalysts, such as those specified hereinabove. Catalyst concentrations of up to 5.0 weight percent based on the weight of epoxide composition have been found to be adequate. However, higher concentrations can be used, if desired. Higher catalyst concentrations promote faster curing rates than lower catalyst concentrations.

Resins formed from curable mixtures containing the epoxide compositions and polycarboxylic acids are resistant to the action of organic solvents, infusible, and hard. Particularly valuable resins can be made from mixtures containing such amounts of our epoxide compositions and polycarboxylic acids as to provide 0.3 to 1.25 carboxyl groups of the acid for each epoxy group contained by the amount of the epoxide composition. It is preferred, however, to make resins from curable mixtures which contain such amounts of polycarboxylic acids and epoxide compositions as to provide 0.3 to 1.0 carboxyl groups of the acid for each epoxy group from the epoxide composition.

Representative polycarboxylic acids include oxalic acid, malonic acid, succinic acid, glutaric acid, adipic acid, pimelic acid, suberic acid, azelaic acid, sebacic acid, alkylsuccinic acids, alkenylsuccinic acids, maleic acid, fumaric acid, itaconic acid, citraconic acid, mesaconic acid, glutaconic acid, allylmalonic acid, muconic acid, alpha-hydromuconic acid, beta-hydromuconic acid, diglycolic acid, dilactic acid, 4-amyl-2,5-heptadienedioic acid, 3-hexynedioic acid, 1,2-cyclohexanedicarboxylic acid, 1,4-cyclohexanedicarboxylic acid, 2 - carboxy - 2 - methylcyclohexaneacetic acid, phthalic acid, isophthalic acid, terephthalic acid, tetrahydrophthalic acid, tetrachorphthalic acid, 1,8-naphthalenedicarboxylic acid, 3-carboxycinnamic acid, 1,2-naphthalenedicarboxylic acid, 1, 1,5-pentanetricarboxylic acid, 1,2,4-hexanetricarboxylic acid, 2-propyl-1,2,4-pentanetricarboxylic acid, 5-octent-3, 3,6-tricarboxylic acid, 1,2,3-propanetricarboxylic acid, 1, 2,4-benzenetricarboxylic acid, 1,3,5-benzenetricarboxylic acid, 3-hexene-2,2,3,4-tetracarboxylic acid, 1,2,3,5-benzenetetracarboxylic acid, benzenepentacarboxylic acid, benzenehexacarboxylic acid, and the like.

Also, as polycarboxylic acids useful in the polymerizable compositions there are included compounds containing ester groups in addition to two or more carboxy groups and which can be aptly termed polycarboxy polyesters of polycarboxylic acids, such as those listed above, or the corresponding anhydrides of said acids, esterified with polyhydric alcohols. Stated in other words, by the term "polycarboxy polyester," as used herein, is meant polyesters containing two or more carboxy groups per molecule. These polycarboxy polyesters can be prepared by known condensation procedures, employing mol ratios favoring greater than equivalent amounts of polycarboxylic acid, or anhydride. More specifically, the amount of polycarboxylic acid, or anhydride, employed in the esterification reaction should contain more carboxy groups than are required to react with the hydroxy groups of the amount of polyhydric reactant. Polyhydric alcohols which can be employed in preparing these polycarboxy polyesters include dihydric alcohols, such as ethylene glycol, diethylene glycol, triethylene glycol, tetraethylene glycol, 1,2-propylene glycol, 1,3-propylene glycol, dipropylene glycols, tripropylene glycols, polyoxyethylene glycols, polyoxypropylene glycols, 1,2-butylene glycol, 1,4-butylene glycol, pentane-1,5-diol, pentane-2,4-diol, 2,2-dimethyltrimethylene glycol, hexane-1,4-diol, hexane-1,5-diol, hexane-1,6-diol, hexane-2,5-diol, 3-methylpentane-1,5-diol, 2-methylpentane-2,5-diol, 3-methylpentane-2,5-diol, 2,2-diethylpropane-1,3-diol, 2,2-diethylhexane-1,3 - diol, 2,5 - dimethylhexane - 2,5 - diol, octadecane - 1,12 - diol, 1 - butene - 3,4 - diol, 2 - butene - 1,4 - diol, 2 - butyne - 1,4 - diol, 2,5 - dimethyl - 3 - hexyne - 2,5 - diol, and the like; trihydric alcohols such as glycerol, trimethylolmethane, hexane - 1,2,6 - triol, 1,1,1 - trimethylolpropane, and the like; tetrahydric compounds, such as pentaglycerol, dipentaerythritol, polyvinyl alcohols, and the like. Additional polyhydric alcohols useful in making polycarboxy polyesters can be prepared by the reaction of epoxides, e.g., diglycidyl diethers of 2,2-propane bisphenol, and reactive hydrogen-containing organic compounds, e.g., amines, polycarboxylic acids, polyhydric compounds and the like. In forming the polycarboxy polyesters that can be employed in the compositions of this invention, it is preferable to use a dihydric, trihydric or tetrahydric aliphatic or oxaaliphatic alcohol. The mol ratios in which the polycarboxylic acid or anhydride can be reacted with polyhydric alcohols in preparing polycarboxy polyesters useful in our compositions are those which provide polyesters having more than one carboxy group per molecule.

As preferred polycarboxylic acids, those which are soluble in 4-vinylcyclohexene dioxide-polyglycidyl polyether systems at a temperature below about 250° C. are advantageously employed.

Curable mixtures containing the epoxide compositions and polycarboxylic acid anhydrides can also be employed to produce useful resins. These curable mixtures can be prepared in manners similar to the preparation of curable mixtures of polycarboxylic acids and the epoxide compositions using similar temperature ranges and procedures for obtaining homogeneous mixtures. Acidic or basic catalysts, such as those specified hereinbefore, are effective in increasing the rate of cure of these mixtures. Catalyst concentrations up to about 5.0 weight percent, based on the weight of epoxide composition have been found to be effective in increasing the rate of cure. Higher catalyst concentrations can be employed, if desired, although concentrations of about 5.0 weight percent and below, have been found to be adequate.

Resins formed from curable mixtures containing polycarboxylic acid anhydrides and our epoxide compositions are infusible, resistant to attack by organic solvents, and hard. Particularly valuable resins can be made from our mixtures containing such amounts of polycarboxylic acid anhydride and epoxide composition as to provide 0.2 to 3.0 carboxy equivalent of the anhydride for each epoxy group of the epoxide composition. It is preferred, however, to make resins from curable mixtures which contain such amounts of polycarboxylic acid anhydride and epoxide composition as to provide 0.4 to 2.0 carboxy equivalent of anhydride for each epoxy group contained by the amount of our epoxide composition.

Typical polycarboxylic acid anhydrides include succinic anhydride, glutaric anhydride, propylsuccinic anhydride, hexylsuccinic anhydride, heptylsuccinic anhydride, pentenylsuccinic anhydride, octenylsuccinic anhydride, nonenylsuccinic anhydride, maleic anhydride, chloromaleic anhydride, dichloromaleic anhydride, itaconic anhydride, citraconic anhydride, hexahydrophthalic anhydride, hexachlorphthalic anhydride, tetrahydrophthalic anhydride, methyltetrahydrophthalic anhydride, tetrachlorphthalic anhydride, hexachloroendomethylenetetrahydrophthalic anhydride, otherwise known as chlorendic anhydride, tetrabromophthalic anhydride, tetraiodophthalic anhydride, phthalic anhydride, 4-nitrophthalic anhydride, 1,2-naphthalic anhydride; polymeric dicarboxylic acid anhydrides, or mixed polymeric dicarboxylic acid anhydrides such as those prepared by the autocondensation of dicarboxylic acids, for example, adipic acid, pimelic acid, sebacic acid, hexahydroisophthalic acid, terephthalic acid, isophthalic acid, and the like. Also, other dicarboxylic acid anhydrides, useful in our polymerizable compositions include the Diels-Alder adducts of maleic acid and aliphatic compounds having conjugated double bonds. Preferred polycarboxylic acid anhydrides are those which are soluble in 4-vinylcyclohexene dioxide-polyglycidyl polyether systems at temperatures below about 250° C.

Valuable thermoset resins can be prepared from mixtures containing such amounts of the epoxide compositions, i.e., 4-vinylcyclohexene dioxide-polyglycidyl polyether of a polyhydric phenol systems, and polyols, that is, polyhydric alcohols or polyhydric phenols, as to provide 0.1 to 2.0, preferably from 0.2 to 1.5, hydroxyl groups of the polyol for each epoxy group contained by the amount of the epoxide composition. By the term "polyol," as used herein, is meant an organic compound having at least two hydroxyl groups which are alcoholic hydroxyl groups, phenolic hydroxyl groups, or both alcoholic and phenolic hydroxyl groups. The epoxide composition and polyol can be mixed in any convenient manner. A preferred method, however, is to mix the polyol and epoxide composition in the liquid state so as to obtain a uniform mixture. In forming this mixture it may be necessary to raise the temperature of the polyol and epoxide composition to at least the melting point or melting point range of the highest melting component. Temperatures below about 150° C. are preferred so as to avoid possible premature curing of these curable mixtures. Stirring also aids the formation of a homogeneous mixture. Acidic or basic catalysts, such as those specified hereinbefore, are effective in increasing the rate of cure of these mixtures. Catalyst concentrations up to 5.0 weight percent based on the weight of epoxide composition have been found to be effective in increasing the rate of cure. Higher catalyst concentrations can be used, if desired.

Representative polyols include ethylene glycol, diethylene glycol, polyethylene glycols, propylene glycol, dipropylene glycol, polypropylene glycols, trimethylene glycol, butanediols, pentanediols, 12,13-tetracosanediol, glycerol, polyglycerols, pentaerythritol, sorbitol, polyvinyl alcohols, cyclohexanediols, inositol, dihydroxytoluenes, resorcinol, catechol, bis(4-hydroxyphenyl)-2,2-propane, bis(4-hydroxyphenyl)methane, and the like.

It is pointed out that valuable resins can be prepared from the epoxide compositions, i.e., 4-vinylcyclohexene dioxide-polyglycidyl polyether systems, by incorporating into said compositions two or more active organic hardeners heretofore enumerated. For example, a mixture of polycarboxylic acids or polycarboxylic acid anhydrides or polyols, etc., can be employed as the active organic hardener components. Also, two or more different organic hardeners can be used such as a polyfunctional amine and a polyol, or a polycarboxylic acid and a polyol, and so forth.

The epoxide compositions and curable mixtures and resins made therefrom are useful in the manufacture of a large variety of useful articles such as combs, brush handles, garden furniture, radio cabinet parts, structural parts, in the potting of electrical parts and the manufacture of protective coatings. The epoxide compositions can be employed as heat and light stabilizers for chlorine-coating resins and can be employed in the manufacture of such condensation resins as phenolformaldehyde resins, urea-formaldehyde resins, melamine-formaldehyde resins and the like to improve the physical properties of such resins. The curable mixtures can be cast or molded using simplified procedures to make numerous articles. These compositions can accept large amounts of a variety of fillers which can impart special properties to resins formed therewith. The curable compositions are also particularly useful in making easily-applied protective coatings and can be cured to hard, durable coatings which are tough, chip resistant and resistant to attack by chemicals and which adhere tenaciously to surfaces of a wide variety of materials including glass and metals. The resins can be machined and polished to provide articles having various configurations and appealing appearances.

The curable compositions and partially cured compositions (intermediate reaction products that are thermosetting viscous liquids or thermosetting solids), i.e., 4-vinylcyclohexene dioxide-polyglycidyl polyether-active organic hardener systems, with or without the use of a catalyst, can be dissolved in a suitable organic solvent such as xylene, methyl isobutyl ketone, butyl acetate, ethyl acetate, toluene, amyl acetate, and the like. The compositions dissolved in the above exemplary list of solvents can be used as, for example, surface coating which can be subsequently heat cured to hard, tough, scratch-resistant coatings.

The proportion of partially cured resin, i.e., thermosetting intermediate reaction products, to solvent will depend on various factors such as the particular mixture being cured, the degree or extent of the partial cure, the particular organic solvent employed, and other considerations. In general, a solution comprising from about 10 to about 90 weight percent of the partially cured resin, based on the total weight of partially cured resin and solvent, is suitable; from about 40 to 70 weight percent of the partially cured resin, based on the total weight of partially cured resin and solvent, is preferred. Moreover, the uncured compositions can be dissolved in the solvents exemplified above and applied to surfaces and subsequently heat cured to form hard, tough coatings. Should the solution comprising the uncured composition or partially cured composition tend to "run" when applied to the surface, as conventional wetting agent and/or thixotropic agent can be added to the solution mixture to insure a more uniform coating on the surface.

In the following illustrative example, Barcol hardness values were determined by the use of Barcol Impressor GYZJ-934-1 at a temperature of approximately 25° C.; Heat Distortion Point values of the resins were ascertained in accordance with ASTM method D-648-45T using 264 p.s.i. fiber stress. Unless otherwise indicated the examination or description of the resins were made at room temperature, i.e., approximately 25° C.

EXAMPLES 1–8

There were admixed, in varying proportions, 4-vinylcyclohexene dioxide and diglycidyl diether of bis(4-hydroxyphenyl)-2,2-propane. The viscosities of the resulting mixtures at 23° C. then were determined with a Brookfield Viscometer, Model LVF. The results are set forth in Table I below.

*Table 1*

| Example No. | 4-vinylcyclohexene dioxide, weight percent [1] | Diglycidyl diether,[2] weight percent [1] | Viscosity of mixture,[3] centipoises |
|---|---|---|---|
| 1 | 100 | 0 | 9.4 |
| 2 | 60 | 40 | 54.4 |
| 3 | 50 | 50 | 112 |
| 4 | 40 | 60 | 172 |
| 5 | 30 | 70 | 442 |
| 6 | 20 | 80 | 1,750 |
| 7 | 10 | 90 | 4,320 |
| 8 | 0 | 100 | 19,500 |

[1] Weight percent of epoxide in question, based on total weight of the system.
[2] Diglycidyl diether of bis(4-hydroxyphenyl)-2,2-propane.
[3] Determined at 23° C.

EXAMPLES 9–16

There were admixed, in varying proportions, 4-vinylcyclohexene dioxide and diglycidyl diether of bis(4-hydroxyphenyl)-2,2-propane. To each mixture there was added a polyfunctional amine adduct prepared by condensing 4 mols of diethylenetriamine with one mol of dian amount so as to provide one amino hydrogen group per epoxy group as contained in the diepoxide system. The resulting mixtures were subsequently heated to 50° C. and manitained thereat for a period of from 2.5 to 4.0 hours with gelation occurring between about 15 to 55 minutes. With the exception of Example 9, all the mixtures were post cured at 160° C. for 6 hours. There were obtained hard, tough resins; the pertinent data and results are shown in Table II below.

Table II

| Example No. | 4-vinylcyclohexene dioxide, wt. percent [1] | Diglycidyl ether, wt. percent [1] | Polyfunctional amine, wt. percent [1] | Barcol hardness | Heat distortion point, °C. |
|---|---|---|---|---|---|
| 9 | 65 | 0 | 35 | 59 | [2] 116 |
| 10 | 42.1 | 28.1 | 29.8 | 54 | 109 |
| 11 | 35.9 | 35.9 | 28.2 | 50 | 108 |
| 12 | 29.3 | 43.9 | 26.8 | 47 | 110 |
| 13 | 22.5 | 52.5 | 25.0 | 44 | 108 |
| 14 | 15.3 | 61.2 | 23.5 | 41 | 110 |
| 15 | 7.8 | 70.3 | 21.9 | 37 | 109 |
| 16 | 0 | 80.0 | 20.0 | 32 | 111 |

[1] Weight percent of component in question, based on total weight of the system.
[2] In Example 9, the mixture was cured to a tough, hard resin as follows: 48 hours at 26° C., 2 hours at 50° C., 2 hours at 80° C., 3.5 hours at 100° C., 24 hours at 120° C., and 6 hours at 160° C.

EXAMPLES 17–28

There was prepared a mixture containing 105 grams of 4-vinylcyclohexene diode and 70 grams of polymeric polyglycidyl polyether of bis(4-hydroxyphenyl)-2,2-propane.[1] The resulting mixture had a viscosity of 2,640 centipoises at 25° C. as determined with a Brookfield Viscometer, Model LVF. The polymeric polyglycidyl polyether of bis(4-hydroxyphenyl)-2,2-propane was a glycidyl diether of bis(4-hydroxyphenyl)-2,2-propane in solid with a melting point of about 95°–105° C. The resulting mixture was then divided into several 1.1 gram portions. To each portion there was added an active organic hardener. Subsequently, these portions were gelled and cured. The pertinent data and results are set forth in Table III below.

Table III

| Example No. | Organic hardener | Grams | Ratio [1] | Gel time, hours, °C. | Cure, hours, °C. | Resin description |
|---|---|---|---|---|---|---|
| 17 | Diethylenetriamine | 0.27 | 1.0 | 16 hr. at 26° | 23 hr. at 26°, 5.5 hr. at 80°, 1.5 hr. at 120°, 6 hr. at 160°. | Pale amber, strong, Barcol, 50. |
| 18 | Ethylenediamine | 0.15 | 1.0 | 16 hr. at 26° | Same as #17 | Pale amber, strong, Barcol, 45. |
| 19 | Methylenedianiline | 0.5 | 1.0 | 7 hr. at 80°, 1 hr. at 120° | 7 hr. at 80°, 8 hr. at 120°, 6 hr. at 160°. | Pale amber, tough, Barcol, 51. |
| 20 | Phthalic anhydride | 0.74 | 1.0 | 0.25 hr. at 120° | 7.5 hr. at 120°, 6 hr. at 160°. | Pale yellow, tough, Barcol, 54. |
| 21 | Maleic anhydride | 0.49 | 1.0 | 23 hr. at 26°, 1.5 hr. at 80° | Same as #17 | Pale yellow, tough, Barcol, 50. |
| 22 | Chlorendic anhydride | 1.13 | 0.6 | About 2 minutes, 120° | 7 hr. at 120°, 6 hr. at 160°. | Pale amber, tough. |
| 23 | Adipic acid | 0.73 | 1.0 | 14 hr. at 120° | 14.5 hr. at 120°, 6 hr. at 160°. | Colorless, tough, Barcol, 0. |
| 24 | Sebacic acid | 1.0 | 1.0 | 17.5 hr. at 120°, 1–2 hr. at 160°. | 17.5 hr. at 120°, 11 hr. at 160°. | Pale yellow, tough, Barcol, 0. |
| 25 | S.A.G.[3] | 1.2 | 1.0 | 12 hr. at 120° | 14 hr. at 120°, 6 hr. at 160°. | White, opaque, tough. |
| 26 | Maleic anhydride / Glycerol | 0.49 / 0.11 | [2] 1.0/0.3 | 16 hr. at 26° | Same as #17 | Pale yellow, tough, Barcol, 50. |
| 27 | Phthalic anhydride / Ethylene glycol | 0.74 / 0.11 | [2] 1.0/0.3 | 12 minutes, at 120° | 5.5 hr. at 120°, 6 hr. at 160° | Pale yellow, tough, Barcol, 27. |
| 28 | Chlorendic anhydride | 1.88 | [2] 1.0/0.3 | 4 minutes at 80° | Same as #27 | Pale yellow, tough, Barcol, 30. |

[1] Carboxyl group (equivalent) of anhydride or acid per epoxy group (equivalent) of the epoxide system, or amino hydrogen group (equivalent) of polyfunctional amine per epoxy group (equivalent) of the epoxide system as indicated.
[2] Carboxyl and hydroxyl groups, respectively.
[3] Adduct of 3 mols of succinic anhydride and 1 mole of glycerol.

EXAMPLES 29–31

There was prepared a mixture containing 105 grams of 4-vinylcyclohexene dioxide and 70 grams of polymeric polyglycidyl polyether of bis(4-hydroxyphenyl)-2,2-propane [2]. The resulting mixture had a viscosity of 22,640 centipoises at 25° C. as determined with a Brookfield Viscometer, Model LVF. The polymeric polyglycidyl polyether of bis(4-hydroxyphenyl)-2,2-propane was a solid with a melting point of about 95°–105° C. The resulting mixture was then divided into three 1.1 gram portions. To each portion there was added a catalytic hardener. Subsequently, these portions were gelled and cured. The pertinent data and results are set forth in Table IV below.

Table IV

| Example No. | Catalytic hardener | Weight percent [1] | Gel time, hours, °C. | Cure, hours, °C. | Resin description |
|---|---|---|---|---|---|
| 29 | KOH [2] | 0.67 | 0.25 hr. at 125° | 6 hr. at 120°, 6 hr. at 160° | Yellow, tough, Barcol, 51. |
| 30 | $H_2SO_4$ [3] | 0.27 | 22 hr. at 26°, 8 hr. at 80°, 3.5 hr. at 120°, 0.25 hr. at 160°. | 22 hr. at 26°, 8 hr. at 80°, 3.5 hr. at 120°, 11 hr. at 160°. | Brown, tough, Barcol, 32. |
| 31 | $BF_3$-piperidine | 2.70 | 0.67 hr. at 120° | 5.5 hr. at 80°, 8 hr. at 120°, 6 hr. at 160°. | Amber, tough, Barcol, 48. |

[1] Weight percent of catalytic hardener, based on the total weight of epoxide.
[2] Added as a 17.2 weight percent solution in ethylene glycol.
[3] Added as a 15 weight percent solution in $H_2O$.

[1] Material obtained from Shell Chemical Corp. under trade name of Epon 1004; possessed an epoxide equivalent weight range of from 870–1025.
[2] Same as footnote 1.

EXAMPLES 32–42

There was prepared a mixture containing 142.5 grams of 4-vinylcyclohexene dioxide and 52.5 grams of polymeric polyglycidyl polyether of bis(4-hydroxyphenyl)-2,2-propane.[3] The resulting mixture had a viscosity of 1,920 centipoises at 26° C. as determined with a Brookfield Viscometer, Model LVF. The polymeric polyglycidyl polyether of bis(4-hydroxyphenyl)-2,2-propane was a solid with a melting point of about 145°–155° C. The resulting mixture was then divided into several 0.95 gram portions. To each portion there was added an active organic hardener. Subsequently, these portions were gelled and cured. The pertinent data and results are set forth in Table V below.

Table V

| Example No. | Organic hardener | Grams | Ratio [1] | Gel time, hours, ° C. | Cure, hours, ° C. | Resin description |
| --- | --- | --- | --- | --- | --- | --- |
| 32 | Diethylenetriamine | 0.27 | 1.0 | 24 hr. at 26°, 0.75 hr. at 80° | 24 hr. at 26°, 3 hr. at 80°; 4 hr. at 120°, 7 hr. at 160°. | Yellow, strong, Barcol, 47. |
| 33 | Ethylenediamine | 0.15 | 1.0 | 6 hr. at 26° | Same as #32 | White opaque, Barcol, 47. |
| 34 | Methylenedianiline | 0.5 | 1.0 | 2 hr. at 120° | 7.5 hr. at 80°, 3.5 hr. at 120°, 6 hr. at 160°. | Yellow, tough, Barcol, 54. |
| 35 | Phthalic anhydride | 0.74 | 1.0 | 0.17 hr. at 120° | 6 hr. at 120°, 6 hr. at 160° | Pale yellow, tough Barcol, 50. |
| 36 | Maleic anhydride | 0.49 | 1.0 | 16 hr. at 26° | 24 hr. at 26°, 3 hr. at 80°, 4 hr. at 120°, 6 hr. at 160°. | Pale yellow, tough Barcol, 56. |
| 37 | Chlorendic anhydride | 1.13 | 0.6 | 2 minutes at 120° | 5 hr. at 80°, 1.75 hr. at 120°, 6 hr. at 160°. | Brown, tough, Barcol, 40. |
| 38 | Adipic acid | 0.73 | 1.0 | 11 hr. at 120°, 0.25 hr. at 160°. | 11 hr. at 120°, 11 hr. at 160°. | Pale amber, tough, Barcol, 0. |
| 39 | Sebacic acid | 1.0 | 1.0 | 11 hr. at 120°, 1–2 hr. at 160°. | Same as #36 | Pale yellow, tough, Barcol, 56. |
| 40 | S.A.G.[2] | 1.2 | 1.0 | 7 hr. at 120° | 7 hr. at 120°, 6 hr. at 160° | White, opaque, tough, Barcol, 0. |
| 41 | Maleic anhydride | 0.49 | [3] 1.0/0.3 | 16 hr. at 26° | 23 hr. at 26°, 3 hr. at 80°, 4 hr. at 120°, 7 hr. at 160°. | Pale yellow, tough, Barcol, 48. |
| 42 | {Phthalic anhydride / Glycerol} | 0.74 / 0.11 | [3] 1.0/0.3 | 4 minutes at 120° | 6 hr. at 120°, 6 hr. at 160° | Pale yellow, brittle. |

[1] In the case of polyfunctional amines, ratio is expressed as amino hydrogen group (equivalent) per epoxy (equivalent) of the epoxide system; in the case of anhydride or acid, the ratio is expressed as carboxyl group (equivalent) per epoxy group (equivalent) of the epoxide system.
[2] Adduct of 3 mols of succinic anhydride and 1 mol of glycerol.
[3] Carboxyl and hydroxyl group (equivalent), respectively, per epoxy group (equivalent) of the epoxide system.

EXAMPLES 43–45

There was prepared a mixture containing 142.5 grams of 4-vinylcyclohexene dioxide and 52.5 grams of polymeric polyglycidyl polyether of bis(4-hydroxyphenyl)-2,2-propane.[4] The resulting mixture had a viscosity of 1,920 centipoises at 26° C. as determined with a Brookfield Viscometer, Model LVF. The polymeric polyglycidyl polyether of bis(4-hydroxyphenyl)-2,2-propane was a solid with a melting point of about 145°–155° C. The resulting mixture was then divided into three 0.95 gram portions. To each portion there was added a catalytic hardener. Subsequently, these portions were gelled and cured. The pertinent data and results are set forth in Table VI below.

Table VI

| Example No. | Catalytic hardener | Weight per cent [1] | Gel time, hours, ° C. | Cure, hours, ° C. | Resin description |
| --- | --- | --- | --- | --- | --- |
| 43 | KOH[2] | 0.46 | 2 minutes at 120° | 7 hr. at 120°, 6 hr. at 160° | Amber, brittle. |
| 44 | H₂SO₄[3] | 0.1 | 23 hr. at 26°, 3 hr. at 80°, 4 hr. at 120°, 1–6 hr. at 160°. | 23 hr. at 26°, 3 hr. at 80°, 4 hr. at 120°, 7 hr. at 160°. | Amber, tough, Barcol, 34. |
| 45 | BF₃-piperidine | 3.0 | 5 hr. at 80° | 5 hr. at 80°, 1.5 hr. at 120°, 6 hr. at 160°. | Amber, tough, Barcol, 43. |

[1] Weight percent of catalytic hardener, based on the total weight of epoxide.
[2] Added as a 17.2 weight percent solution in ethylene glycol.
[3] Added as a 5 weight percent solution in H₂O.

EXAMPLES 46–55

There was prepared a mixture containing 15 grams of 4-vinylcyclohexene dioxide and 85 grams of diglycidyl diether of bis(4-hydroxyphenyl)-2,2-propane. The resulting mixture had a viscosity of 1,960 centipoises at 26° C. as determined with a Brookfield Viscometer, Model LVF. This mixture was then divided into several 0.91 gram portions. To each portion there was added an active organic hardener. Subsequently, these portions were gelled and cured. The pertinent data and results are set forth in Table VII below.

---

[3] Material obtained from Shell Chemical Corp. under trade name of Epon 1009; possessed an epoxide equivalent weight range of from 2,400–4,000.
[4] Same as footnote 3.

Table VII

| Example No. | Organic hardener | Grams | Ratio [1] | Gel time, hours, °C. | Cure, hours, °C. | Resin description |
|---|---|---|---|---|---|---|
| 46 | Ethylenediamine | 0.15 | 1.0 | 2 hr. at 26° | 2 hr. at 26°, 1.5 hr. at 80°, 1.5 hr. at 120°, 6 hr. at 160°. | Pale amber, tough, Barcol 41. |
| 47 | Methylenedianiline | 0.5 | 1.0 | 2 hr. at 80° | 4 hr. at 80°, 1.75 hr. at 120°, 6 hr. at 160°. | Amber, tough, Barcol 41. |
| 48 | Phthalic anhydride | 0.74 | 1.0 | 9 hr. at 120°, 1-2 hr. at 160° | 9 hr. at 120°, 11 hr. at 160° | Yellow, tough, Barcol, 21. |
| 49 | Maleic anhydride | 0.49 | 1.0 | 22 hr. at 26°, 3 hr. at 80°, 3 hr. at 120°. | 22 hr. at 26°, 3 hr. at 80°, 4 hr. at 120°, 7 hr. at 160°. | Pale amber, tough, Barcol, 33. |
| 50 | Chlorendic anhydride | 1.13 | 0.6 | 32 minutes at 26° | 2 hr. at 26°, 1.5 hr. at 80°, 1.5 hr. at 120°, 6 hr. at 160°. | Pale yellow, tough, Barcol, 53. |
| 51 | Adipic acid | 0.73 | 1.0 | 8.5 hr. at 120°, 0.25 hr. at 160°. | 8.5 hr. at 120°, 11 hr. at 160°. | Pale yellow, tough, Barcol, 0. |
| 52 | Ethylenediamine | 0.23 | 1.5 |  | 3 hr. at 120°, 6 hr. at 160° | Pale amber, tough. |
| 53 | S.A.G.[2] | 1.2 | 1.0 | 3.5 hr. at 120° | 5 hr. at 120°, 6 hr. at 160 | Pale yellow, tough, Barcol, 0. |
| 54 | Phthalic anhydride / Glycerol | 0.74 / 0.11 | [3] 1.0/0.3 | 4.5 hr. at 120° | 5 hr. at 120°, 6 hr. at 160 | Pale yellow, strong, Barcol, 40. |
| 55 | Chlorendic anhydride / Poly(ethylene glycol) [4] | 1.88 / 0.33 | [3] 1.0/0.3 | 1 hr. at 80° | 3 hr. at 80°, 1.75 hr. at 120°, 6 hr. at 160°. | Pale yellow, tough, Barcol 35. |

[1] In the case of polyfunctional amines, ratio is expressed as amino hydrogen group (equivalent) per epoxy (equivalent) of the epoxide system; in the case of anhydride of acid, the ration is expressed as carboxyl group (equivalent) per epoxy group (equivalent) of the epoxide system.
[2] Adduct of 3 mols of succinic anhydride and 1 mol of glycerol.
[3] Carboxyl and hydroxyl group (equivalent), respectively, per epoxy group (equivalent) of the epoxide system.
[4] Poly(ethylene glycol) having an average molecular weight of 200.

EXAMPLE 56

To one of the 0.91 gram portions (not conatining the organic hardener) described in Examples 46 to 55 there was added 0.5 weight percent of potassium hydroxide (added as a 17.2 weight percent solution in ethylene glycol). The resulting mixture was heated to 120° C. and maintained thereat for 0.3 hour during which period of time gelation occurred. A post cure was effected for 5 hours at 120° C. plus an additional 6 hours at 160° C. There was obtained a yellow, tough resin having a Barcol hardness of 40.

EXAMPLES 57-64

There were admixed, in varying proportions, 4-vinylcyclohexene dioxide and diglycidyl diether of bis(4-hydroxyphenyl)2,2-propane. To each mixture there was added a polyfunctional amine adduct prepared by condensing 4 mols of diethylenetriamine with one mol of diglycidyl diether of bis(4-hydroxyphenyl)2,2-propane in an amount so as to provide one amino hydrogen group (atom) per epoxy group as contained in the diepoxide system. The resulting mixtures were poured into aluminum foil "boat" molds and exposed to room temperature conditions; the time at which gelation occurred was recorded. After exposure to room temperature conditions for 54 hours, the mixtures were post cured for 5 hours at 50° C., 3 hours at 100° C., and 6 hours at 160° C. The pertinent data and results are shown in Table VIII below.

Table VIII

| Example No. | 4-vinylcyclohexane dioxide; grams | Diglycidyl diether; grams | Wt. percent 4-vinylcyclohexene dioxide [1] | Amine adduct, grams | Gel time 25° C; Hours | Resin description [2] | Heat distortion point, °C.[3] | Barcol hardness [3] |
|---|---|---|---|---|---|---|---|---|
| 57 | 25.0 | 0.0 | 100 | 17.8 | 6-17 | Hard | 96 | 45 |
| 58 | 22.5 | 2.5 | 90 | 16.8 | 6-17 | do | 99 | 50 |
| 59 | 15.0 | 10.0 | 60 | 13.3 | 6-17 | Hard, Barcol, 10 | 104 | 48 |
| 60 | 12.5 | 12.5 | 50 | 12.2 | 6-17 | Hard, Barcol, 20 | 112 | 48 |
| 61 | 10.0 | 15.0 | 40 | 11.1 | 4.75 | Hard, Barcol, 25 | 112 | 50 |
| 62 | 7.5 | 17.5 | 30 | 10.0 | 2.5 | Tough, Barcol, 22 | 108 | 47 |
| 63 | 5.0 | 20.0 | 20 | 8.8 | 2.0 | Tough, Barcol, 20 | 112 | 47 |
| 64 | 2.5 | 22.5 | 10 | 7.7 | 1.5 | Tough, Barcol, 22 | 112 | 45 |

[1] Based on the total weight of epoxide.
[2] Resin description after 54 hours at 25° C.
[3] After post cure of 5 hours at 50° C., 3 hours at 100° C., and 6 hours at 160° C.

EXAMPLES 65-72

The procedure set forth in Examples 57-64 was repeated except limonene dioxide was employed in lieu of 4-vinylcyclohexene dioxide. The pertinent data and results are shown in Table IX below.

Table IX

| Example No. | Limonene dioxide, grams | Diglycidyl Diether, grams | Wt. percent limonene dioxide [1] | Amine adduct, grams | Gel time 25° C, hours | Resin description [2] | Heat distortion point, °C [3] | Barcol hardness [3] |
|---|---|---|---|---|---|---|---|---|
| 65 | 25.0 | 0 | 100 | 14.8 | No gel formed | Liquid | No resin obtained |  |
| 66 | 22.5 | 2.5 | 90 | 14.1 | do | do | do |  |
| 67 | 15.0 | 10.0 | 60 | 11.6 | Gelled at 50°C | Viscous Liquid | Resin too weak |  |
| 68 | 12.5 | 12.5 | 50 | 10.7 | 3-18 | Very soft | 83 | 43 |
| 69 | 10.0 | 15.0 | 40 | 9.9 | 3-18 | Soft | 91 | 42 |
| 70 | 7.5 | 17.5 | 30 | 8.9 | 3.0 | Tough, Barcol, 0 | 96 | 45 |
| 71 | 5.0 | 20.0 | 20 | 8.1 | 1.8 | Tough Barcol, 8 | 101 | 45 |
| 72 | 2.5 | 22.5 | 10 | 7.4 | 1.5 | Tough Barcol, 11 | 110 | 45 |

[1] Based on total weight of epoxide.
[2] Resin description after 54 hours.
[3] After post cure of 5 hours at 50° C., 3 hours at 100° C., and 6 hours at 160° C.

The data disclosed in Tables VIII and IX clearly illustrate that increasing concentrations of limonene dioxide adversely affects the room temperature properties of the amine hardened resins. Moreover, the heat distortion points of the post cured resins were correspondingly lower as the concentration of limonene dioxide was increased.

At concentrations of 60 weight percent, and higher, of limonene dioxide, the mixture failed to form a resin.

Although the invention has been illustrated by the preceding examples, the invention is not to be construed as limited to the materials employed in the above-said exemplary examples, but rather, the invention encompasses the generic area as hereinbefore disclosed. Various modifications and embodiments of this invention can be made without departing from the spirit and scope thereof.

What is claimed is:

1. A curable epoxide composition consisting essentially of a diglycidyl diether of a dihydric phenol and from about 2 to 98 weight percent of 4-vinylcyclohexene dioxide, based on the total weight of the epoxide components.

2. A solid resin obtained from a curable composition consisting essentially of a diglycidyl diether of a dihydric phenol and from about 2 to 98 weight percent of 4-vinylcyclohexene dioxide, based on the total weight of the above-said epoxide components.

3. A curable epoxide composition consisting essentially of a diglycidyl diether of a dihydric phenol and from about 10 to 90 weight percent of 4-vinylcyclohexene dioxide, based on the total weight of the epoxide components.

4. The composition of claim 3 wherein the diglycidyl diether is a diglycidyl diether of bis(4-hydroxyphenyl)-2,2-propane.

5. A solid resin obtained from a curable composition consisting essentially of a diglycidyl diether of a dihydric phenol and from about 10 to 90 weight percent of 4-vinylcyclohexene dioxide, based on the total weight of the above-said epoxide components.

6. A curable composition consisting essentially of an epoxide composition of a diglycidyl diether of a dihydric phenol; from about 2 to 98 weight percent of 4-vinylcyclohexene dioxide, based on the total weight of said diglycidyl diether of a dihydric phenol and said 4-vinylcyclohexene dioxide; and a curing amount of an active organic hardener selected from the group consisting of difunctional amines, dihydric alcohols, dihydric phenols, dicarboxylic acids, and dicarboxylic acid anhydrides.

7. A solid resin obtained from the curable composition of claim 6.

8. A curable composition consisting essentially of an epoxide composition of a diglycidyl diether of a dihydric phenol; from about 10 to 90 weight percent of 4-vinylcyclohexene dioxide, based on the total weight of said diglycidyl diether of a dihydric phenol and said 4-vinyl cyclohexene dioxide; and an active organic hardener selected from the group consisting of a (a) difunctional amine in such proportions as to provide from 0.2 to 5.0 amine hydrogen atoms of said difunctional amine per epoxy group of said epoxide composition (b) dihydric alcohol in such proportions so as to provide from 0.1 to 2.0 hydroxyl groups of said dihydric alcohol per epoxy group of said epoxide composition (c) dihydric phenol in such proportions so as to provide from 0.1 to 2.0 hydroxyl groups of said dihydric phenol per epoxy group of said epoxide composition (d) dicarboxylic acid in such proportions so as to provide from 0.3 to 1.25 carboxyl groups of said dicarboxylic acid per epoxy group of said epoxy composition, and (e) dicarboxylic acid anhydride in such proportions so as to provide from 0.2 to 3.0 carboxyl groups of said dicarboxylic acid anhydride per epoxy group of said epoxide composition.

9. A solid resin obtained from the curable composition of claim 8.

10. The curable mixture of claim 8 wherein said active organic hardener is a difunctional amine.

11. The curable mixture of claim 8 wherein said active organic hardener is a dicarboxylic acid.

12. The curable mixture of claim 8 wherein said active organic hardener is a dicarboxylic acid anhydride.

13. The curable mixture of claim 8 wherein said active organic hardener is a dihydric phenol.

14. The curable mixture of claim 8 wherein said active organic hardener is a dihydric alcohol.

15. The curable composition of claim 8 wherein said diglycidyl diether is a diglycidyl diether of bis(4-hydroxyphenyl)-2,2-propane.

References Cited by the Examiner

UNITED STATES PATENTS

| | | | |
|---|---|---|---|
| 2,512,996 | 6/1950 | Bixler | 260—830 |
| 2,849,416 | 8/1958 | Bender et al. | 260—830 |
| 3,100,756 | 8/1963 | Fry | 260—30.4 |

OTHER REFERENCES

Beasley, D. R., Diepoxides With Improved Properties, in SPE Journal, Vol. 15, pp. 289–291, April 1959.

May et al., Reactive Diluents for Epoxy Adhesives, in Industrial and Engineering Chemistry, Vol. 53, No. 4, April, 1961, pp. 303–304.

Lee et al., Epoxy Resins, McGraw-Hill, N.Y. 1957, pp. 115–140.

MURRAY TILLMAN, *Primary Examiner.*

LEON J. BERCOVITZ, *Examiner.*